(12) United States Patent
Tiessen et al.

(10) Patent No.: US 7,793,739 B2
(45) Date of Patent: Sep. 14, 2010

(54) OVERLOAD PROTECTION DEVICE FOR AGRICULTURAL APPLIANCES

(75) Inventors: Reimer U. Tiessen, Oldenburg (DE); Michael Pokriefke, Hude (DE); Stefan Altmann, Leipzig (DE); Jurgen Sosnicki, Leipzig (DE); Wilfried Reinke, Oldenburg (DE)

(73) Assignee: Amazonen-Werke H. Dreyer GmbH & Co. KG, Hasbergen (DE)

( * ) Notice: Subject to any disclaimer, the term of this patent is extended or adjusted under 35 U.S.C. 154(b) by 42 days.

(21) Appl. No.: 11/996,513

(22) PCT Filed: Jul. 26, 2006

(86) PCT No.: PCT/EP2006/007364

§ 371 (c)(1),
(2), (4) Date: Jun. 18, 2008

(87) PCT Pub. No.: WO2007/014682

PCT Pub. Date: Feb. 8, 2007

(65) Prior Publication Data

US 2008/0264653 A1    Oct. 30, 2008

(30) Foreign Application Priority Data

Aug. 3, 2005   (DE) ................. 10 2005 037 098

(51) Int. Cl.
   *A01B 15/00*   (2006.01)
(52) U.S. Cl. ........................ 172/705; 172/261
(58) Field of Classification Search ............ 172/705, 172/707, 708, 710, 551, 572, 573, 261
   See application file for complete search history.

(56) References Cited

U.S. PATENT DOCUMENTS

| | | | | |
|---|---|---|---|---|
| 2,850,956 A | * | 9/1958 | Rogers et al. | 172/705 |
| 3,480,086 A | * | 11/1969 | Groenke | 172/710 |
| 3,981,367 A | * | 9/1976 | Mydels | 172/265 |
| 4,078,615 A | * | 3/1978 | Kelley | 172/711 |
| 4,142,587 A | * | 3/1979 | Woodward et al. | 172/47 |
| 4,177,865 A | * | 12/1979 | Lewison | 172/705 |
| 4,261,423 A | * | 4/1981 | Williamson | 172/705 |
| 4,461,358 A | * | 7/1984 | Lewison | 172/705 |
| 4,609,051 A | | 9/1986 | Good | |
| 5,427,183 A | | 6/1995 | Parker | |

FOREIGN PATENT DOCUMENTS

| | | |
|---|---|---|
| AU | 19794782979 | 12/1979 |
| DE | 10313179 | 10/2004 |
| GB | 2045041 | 10/1980 |

* cited by examiner

*Primary Examiner*—Robert E Pezzuto
*Assistant Examiner*—Jamie L McGowan
(74) *Attorney, Agent, or Firm*—Marshall, Gerstein & Borun LLP

(57) ABSTRACT

Overload protection device for agricultural appliances, such as for example agricultural implements with a joint connecting the agricultural tool to the carrier frame, having two joint parts held together by spring load and mutually supporting, of which one is mounted on the agricultural tool and the other on the carrier frame. On both joint parts at least one upper support arrangement and at least one lower support arrangement are arranged as spaced from one another, with the lower support arrangement (9, 20) having at least one pivot bolt (10, 23) extending horizontally and transversely to the working direction and at least one joint retainer (11) supported on the pivot bolt (10, 23) and having a V or U-shaped cross-section.

11 Claims, 18 Drawing Sheets

OVERLOAD PROTECTION DEVICE FOR AGRICULTURAL APPLIANCES

CROSS-REFERENCE TO RELATED APPLICATION

The present application claims the benefit of priority of International Patent Application No. PCT/EP2006/007364, filed on Jul. 26, 2006, which application claims priority of German Patent Application No. 10 2005 037 098.5, filed Aug. 3, 2005. The entire text of the priority application is incorporated herein by reference in its entirety.

FIELD OF THE DISCLOSURE

The disclosure relates to an overload protection device for agricultural appliances, such as agricultural tools connected to a carrier frame.

BACKGROUND

An overload protection device of this nature is known for example from DE 103 13 179 A1. This overload protection device is intended for use with an agricultural implement formed as a cultivator. This overload protection device facilitates the three-dimensional deviation of the prong when impinging obstacles located in the ground. Thus the agricultural tool can then yield sidewards as well as upwards. The design of the overload protection device is rugged and formed for relatively heavy equipment.

SUMMARY OF THE DISCLOSURE

The object of the disclosure is to provide a simple and reasonably priced overload protection device which enables the agricultural tool to yield both sidewards and upwards.

In contrast to the state of the art the main reactive force is transferred from the engagement of the agricultural tool in the soil directly into the lower support arrangement, so that the spring arrangement does not need to accept the total tensile forces originating from the engagement of the agricultural tool in the soil. Instead with this arrangement, the forces are transferred directly into the lower support arrangement. Furthermore, the agricultural tool can be swivelled about the articulated axle which passes through the pivot bolt on yielding backwards when it meets obstacles in the soil. At the same time the agricultural tool can also yield sidewards, because, due to the V or U-shape of the cross-section of the lower joint retainer which is supported by the pivot bolt, the joint retainer lifts up from the pivot bolt so that the agricultural tool can yield sidewards.

In order to obtain the lowest possible area pressure in conjunction with the joint retainer and the pivot bolt, provision is made that the V or U-shaped joint retainer extends over the length of the pivot bolt.

With the sidewards yield and the spring return of the agricultural tool it has been found that it is advantageous when the V or U-shaped joint retainer has two funnel-shaped joint bearing surfaces arranged facing one another with rounded swivel bearing surfaces matched to the pivot bolt.

A simple embodiment of the lower support arrangement can be achieved in that the V or U-shaped joint retainer has two fork-shaped elements, arranged spaced relative to one another and which are supported on the pivot bolt.

In order to be able to transfer the forces particularly advantageously into the lower support and joint retainer arrangement, provision is made that the joint retainer is assigned to the joint part assigned to the agricultural tool and the pivot bolt is assigned to the joint part arranged on the carrier frame.

An advantageous spring arrangement can be obtained in that the spring arrangement producing the spring load is arranged between the carrier frame and the upper support arrangement.

Instead of an open joint retainer, which is only formed on one side with a V or U-shaped cross-section, the joint arrangement can also be formed similar to an elongated hole, wherein in an advantageous manner the longitudinal extent of the retainer similar to an elongated hole corresponds to at least double the diameter of the pivot bolt. It has been found to be advantageous if the upper support arrangement is assigned at least one damping element so that once the obstacle located in the soil has been overcome by the agricultural tool, the upper support arrangement of the agricultural tool impacts against the mounting in a damped manner.

The damping element is formed as an elastic plate, for example, consisting of polyurethane or rubber.

A simple version of the overload protection device, which can be mounted in a simple manner on the carrier frame, can be produced in that the overload protection device has a mounting element, which can be arranged on the carrier frame, and which has a mounting region formed by its at least approximately horizontal upper side, in that the support arrangements with the agricultural tool and the spring device producing the spring load are arranged on the mounting element.

In order that the agricultural tool can be arranged in a transverse row in two intermediate transverse rows in a simple manner on the carrier frame in a staggered manner, provision is made that the mounting region of the mounting element extends in the direction of travel over a larger length than in the transverse direction.

In order to be able to arrange the mounting element in a simple and optimum manner on the carrier frame in relation to the adjacent agricultural tool, provision is made that the mounting element has several mounting regions located one behind the other.

A very flexible arrangement of the overload protection device of the agricultural tool, which is possible at any place on the carrier frame can be realized in that the complete overload protection device with the agricultural tool and joint parts is arranged below the carrier frame.

An independent and advantageous embodiment of the carrier frame of the agricultural implement, independent of the embodiment of the agricultural tool and the mounting region of the overload protection device of the agricultural tools on the carrier frame, can be realized in that the overload protection device and the agricultural tool are arranged and formed such that also in the upper yield position of the agricultural tool it is located below the level of the carrier frame.

BRIEF SUMMARY OF THE DRAWINGS

Further details of the disclosure can be taken from the remaining dependent claims, example description and drawings. In this respect the following are shown:

DETAILED DESCRIPTION OF THE DISCLOSURE

Figure 1:
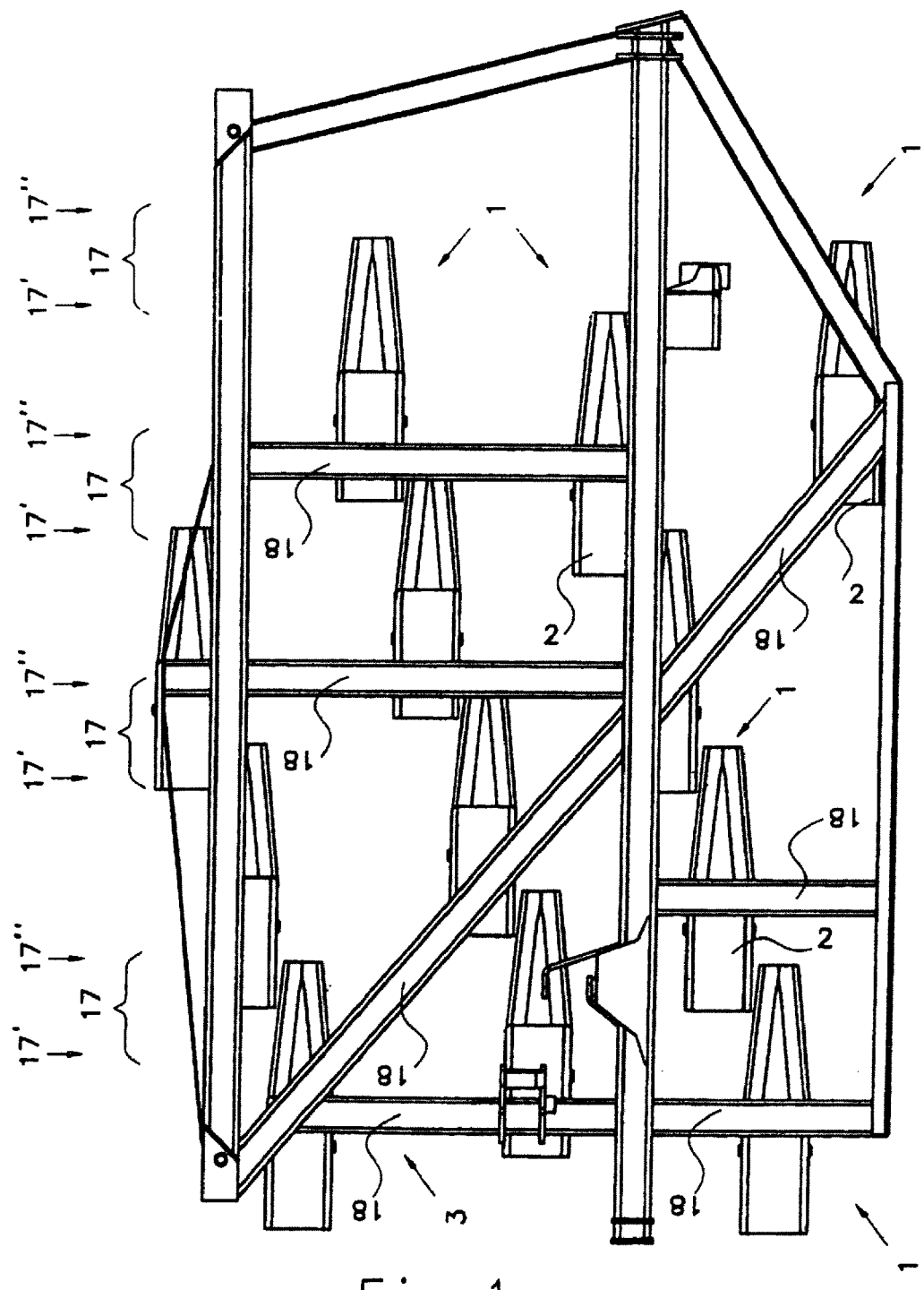
FIG. 1 the arrangement of the agricultural tools on the side frame of an agricultural implement formed as a cultivator in plan view, FIG. 2 the agricultural tool in a perspective illustration, FIG. 3 the agricultural tool in a side view, FIG. 4 the agricultural tool in a perspective illustration viewed from the front right, FIG. 5 the agricultural tool viewed from the front, FIG. 6 the agricultural tool in a perspective view and in an exploded view, FIG. 7 the agricultural tool in a side view in a position deflected to the back, FIG. 8 the agricultural tool according to FIG. 7 viewed from the back, FIG. 9 the agricultural tool according to FIG. 7 in the plan view, FIG. 10 the agricultural tool in a sideways yielded position in a side view, FIG. 11 the agricultural tool according to FIG. 10 viewed from the back, FIG. 12 the agricultural tool according to FIG. 10 in the plan view, FIG. 13 the agricultural tool in a sideways position, yielded to the back, in a side view, FIG. 14 the agricultural tool according to FIG. 13 viewed from the back, FIG. 15 the agricultural tool according to FIG. 13 in the plan view, FIG. 16 a further agricultural tool, which can be fitted to the carrier frame of a cultivator, in a perspective illustration, FIG. 17 the agricultural tool according to FIG. 16 viewed from the back, and FIG. 18 the agricultural tool according to FIG. 16 in a perspective illustration, but in a position yielded to the back.
Figure 2:
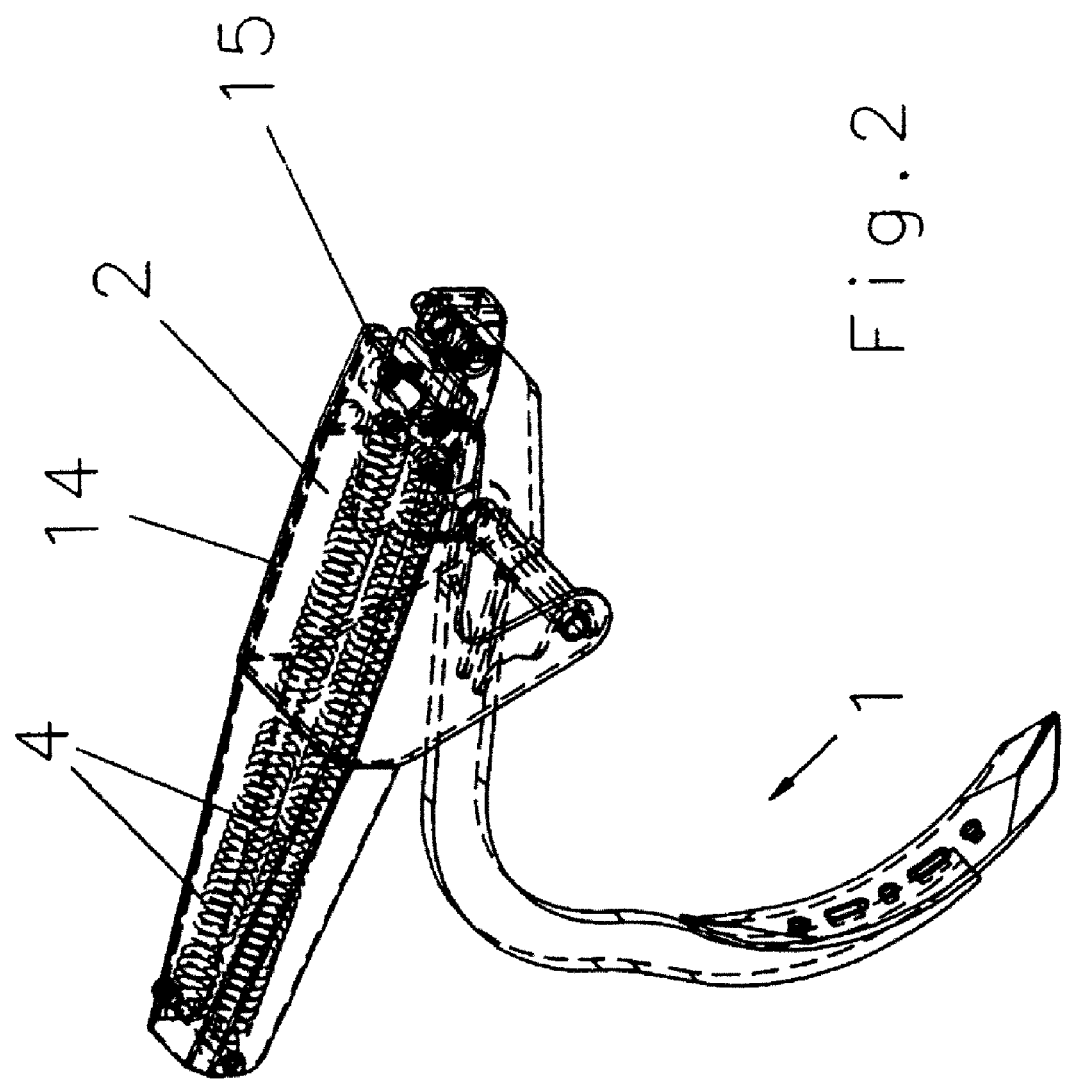
Figure 3:
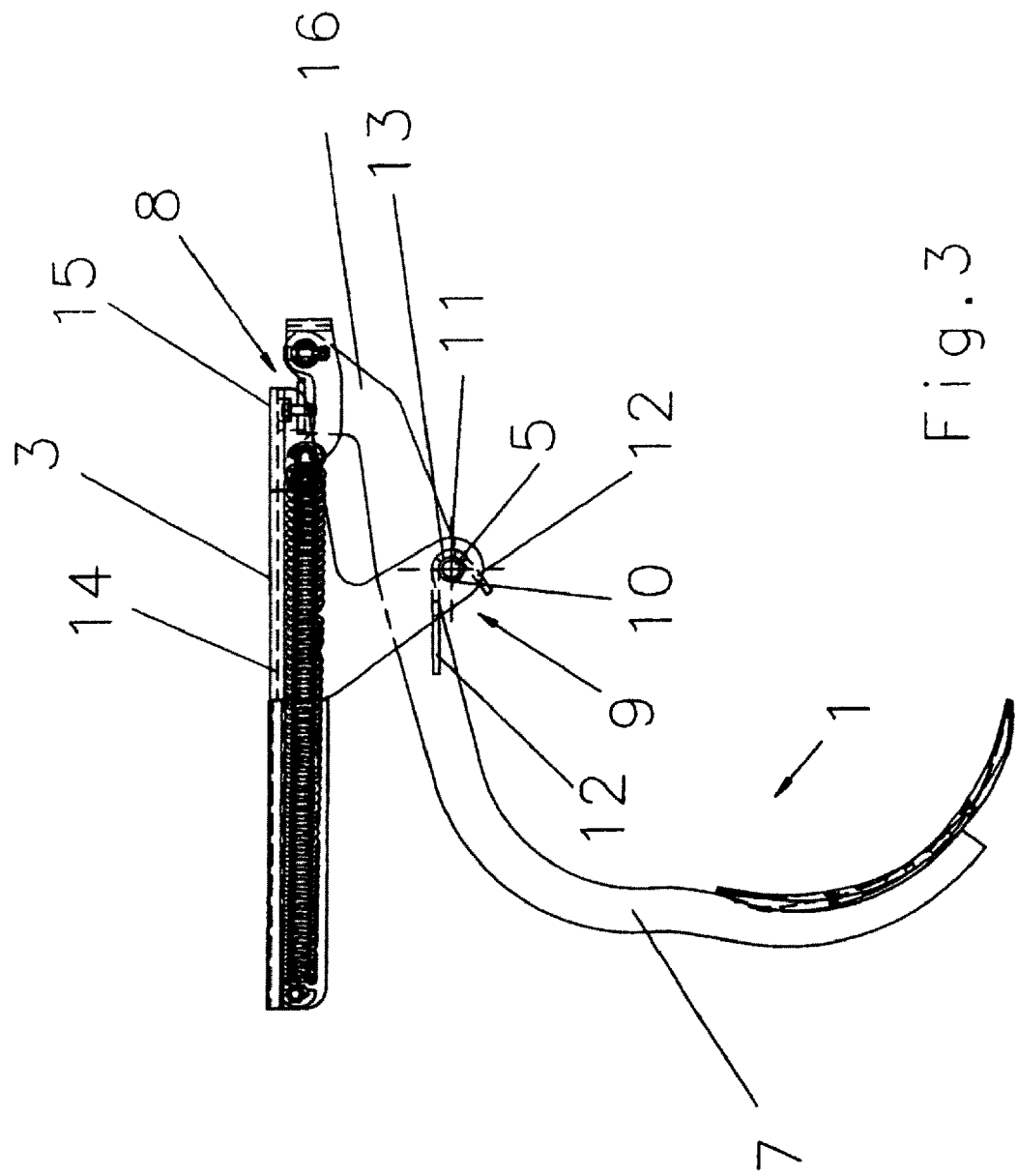
Figure 4:
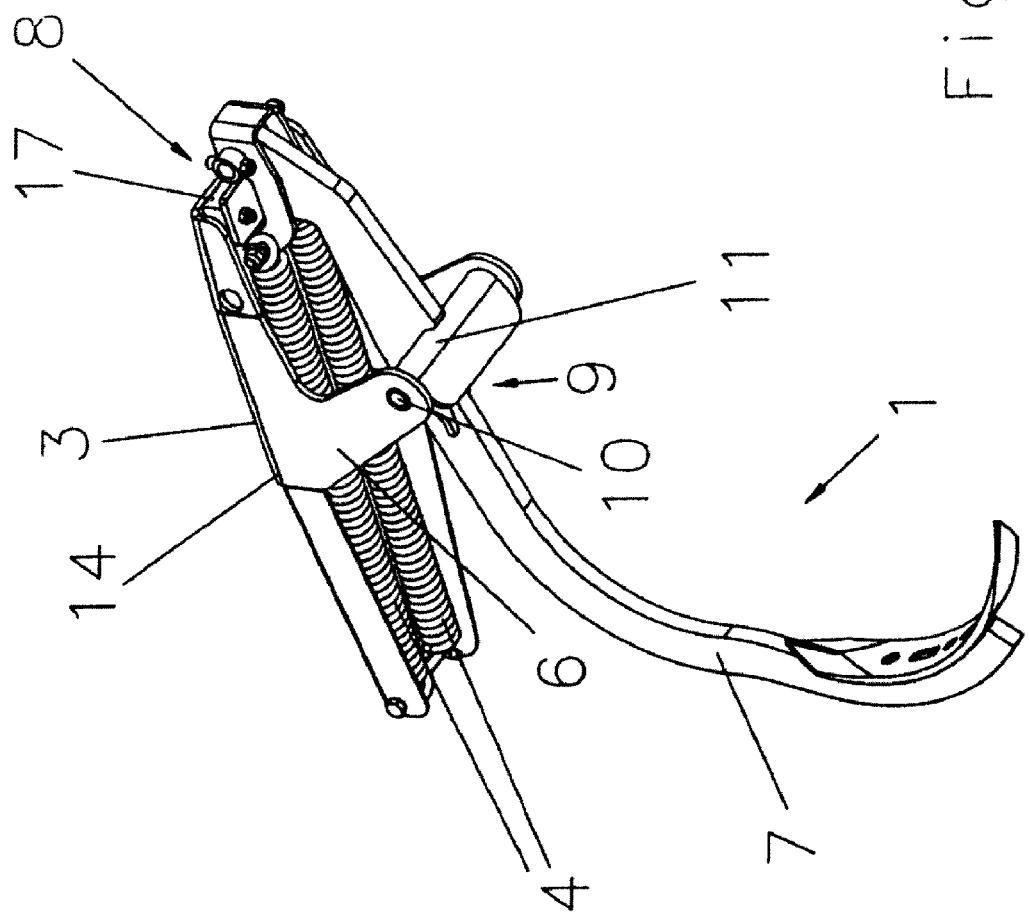
Figure 5:
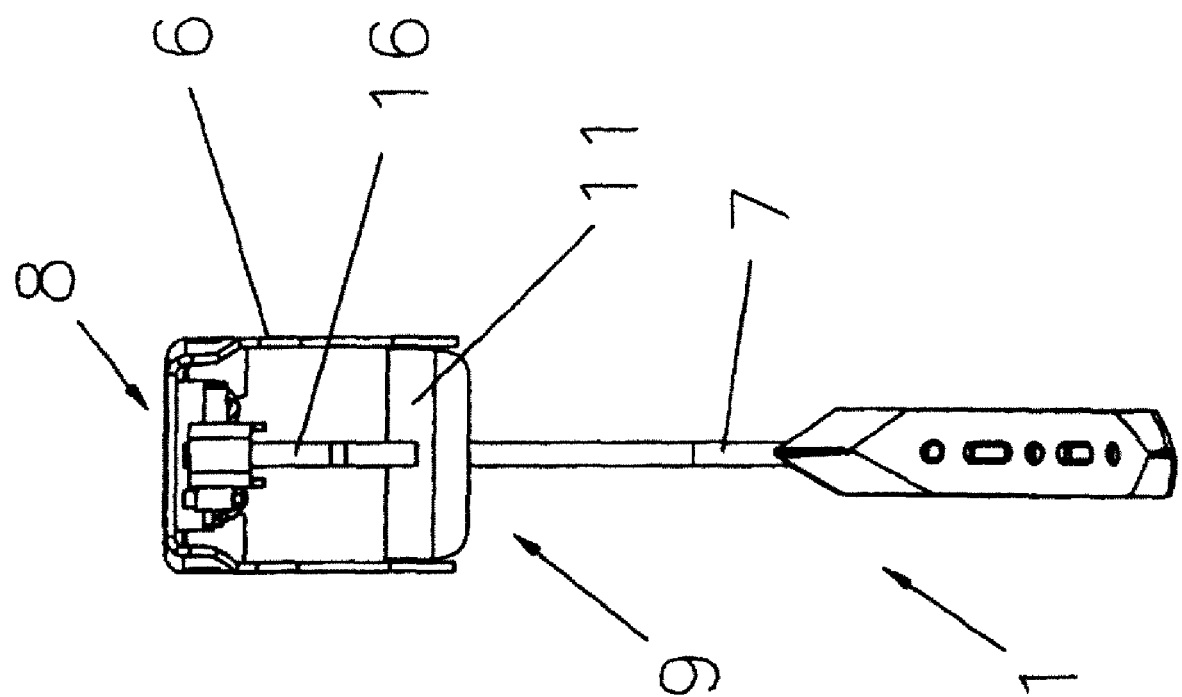
Figure 6:
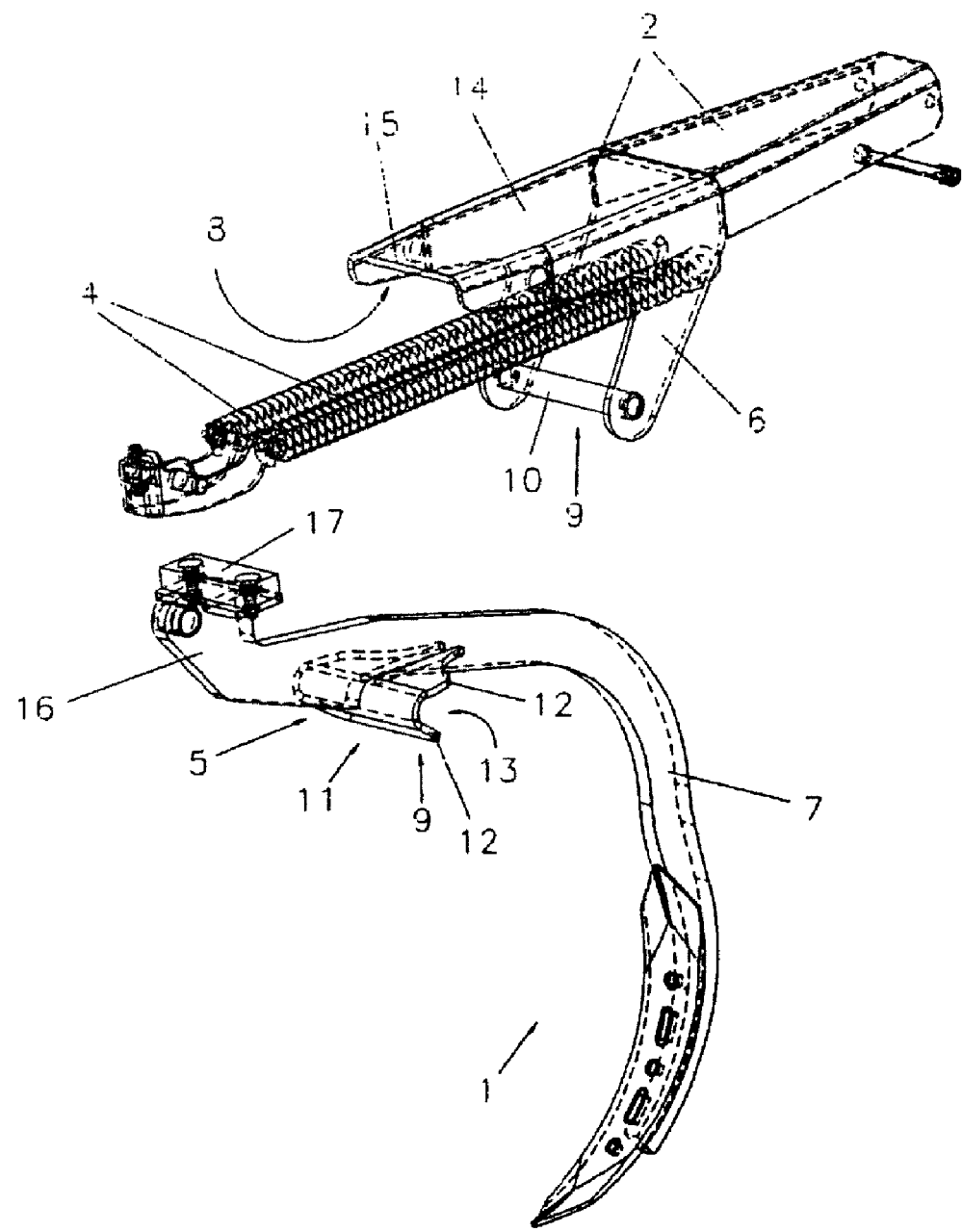

Agricultural tools 1, which are formed as cultivator prongs, are arranged with their mounting region 2 on the carrier frame 3 of an agricultural device, which in the embodiment is an agricultural implement formed as a cultivator, of which a side frame is illustrated in FIG. 1. The agricultural tool 1 has two joint parts 5 and 6, which are held together by the spring load applied by the tensile springs 4 and which support one another. One joint part 5 carries the agricultural tool formed as a cultivator prong 7, whereas the other joint part 6 is mounted via the mounting region 2 on the carrier frame 3. Both joint parts 5 and 6 have an upper support arrangement 8 and a lower support arrangement 9, wherein the upper 8 and lower 9 support arrangement are arranged spaced from one another. The lower support arrangement 9 has the pivot bolt 10, which extends transverse to the direction of travel and which is arranged on the joint part 6 which is arranged on the carrier frame 3, whereas the other joint part 5 has the joint retainer 11 which is supported by the pivot bolt 10 and is V or U-shaped in cross-section. According to the embodiment in FIGS. 2-15 the U-shaped or V-shaped joint retainer 11 extends over the complete length of the pivot bolt 10. The V or U-shaped joint retainer 11 has two funnel-shaped joint bearing surfaces 12 arranged facing one another with round swivel bearing surfaces 13 matched to the pivot bolt 10, as shown in FIGS. 3 and 6.

The upper joint part 6 has the mounting 14 with the mounting region 2 extending horizontally for fastening the agricultural tool 1 in the carrier frame 3. Furthermore, the mounting 14 in its front region 15 in conjunction with the mounting part 16, which extends from the V or U-shaped joint retainer 11 to the front top, acts as the upper support arrangement 8. On the support region of the mounting part 16—opposite the mounting 14, when the prong is in the mounted position arranged on the V or U-shaped joint retainer—a damping element 7 is provided, which is manufactured from polyurethane or rubber and which acts against the front region 15 of the mounting 14. The spring arrangement 4, which is attached at its rear side to the rear end of the mounting 16, acts on the front upper end of the mounting 14. The two joint parts 5 and 6 are held together by the spring arrangement 4.

Thus, the support arrangement with the agricultural tool 7 and the spring device 4 producing the spring force are arranged on the mounting 14. The mounting region 2 of the mounting 14 extends in the direction of travel over a longer length than in its transverse direction.

As FIG. 1 illustrates, the agricultural tools 1 are arranged in four transverse rows 17 lying one behind the other, wherein the agricultural tools 1 in each transverse row 17 are arranged staggered in intermediate transverse rows 17' and 17". This arrangement in intermediate transverse rows 17' and 17" in a transverse row 17 is obtained in that the agricultural tools 1 with their mounting region 2 are arranged in different ways on the beam 18 of the carrier frame 3, as shown in FIG. 1. The overload protection device, which is formed by the joint arrangement 5, 6 and the spring 4, is arranged below the carrier frame 3 with the complete overload protection device with agricultural tools 1, 7 and joint parts 5, 6. In this respect the overload protection device 4, 5, 6 and the agricultural tool 1, 7 are arranged and designed such that also in the upper yield position of the agricultural tool 1, 7 it is located below the level of the carrier frame 3. Due to the design of the overload protection device 4, 5, 6, which is formed by the spring arrangement 4 and by the pivot bolts 10 and the V or U-shaped joint retainer 11, the agricultural tool 1, 7 can yield backwards and to the side. The assignment of the pivot bolt 10 and the cross-section of the V or U-shaped joint retainer 11 is formed, as shown in FIGS. 2 to 15, such that the V or U-shaped joint retainer 11 is open at the back and contacts the front of the pivot bolt 10 with its joint retainer 11, so that the force acting on the cultivator prong 7 due to the agricultural tool 1 engaging the soil is transferred directly via the V-shaped joint retainer 11 into the pivot bolt 10 of the mounting 14. The spring arrangement 4 pulls the agricultural tool 1 into the working position illustrated in FIGS. 2 to 6, wherein the upper end of the mounting 16 comes into contact with the damping element 17 on the mounting element 14.

At this point it is pointed out that it is also possible to arrange the pivot bolt 10 between the cultivator prong 7 and the mounting part 16 and the V or U-shaped retainer 11 on the joint part 6, wherein then the V or U-shaped retainer 11 is open at the front so that the pivot bolt in the V or U-shaped retainer makes appropriate contact.

Figure 7:
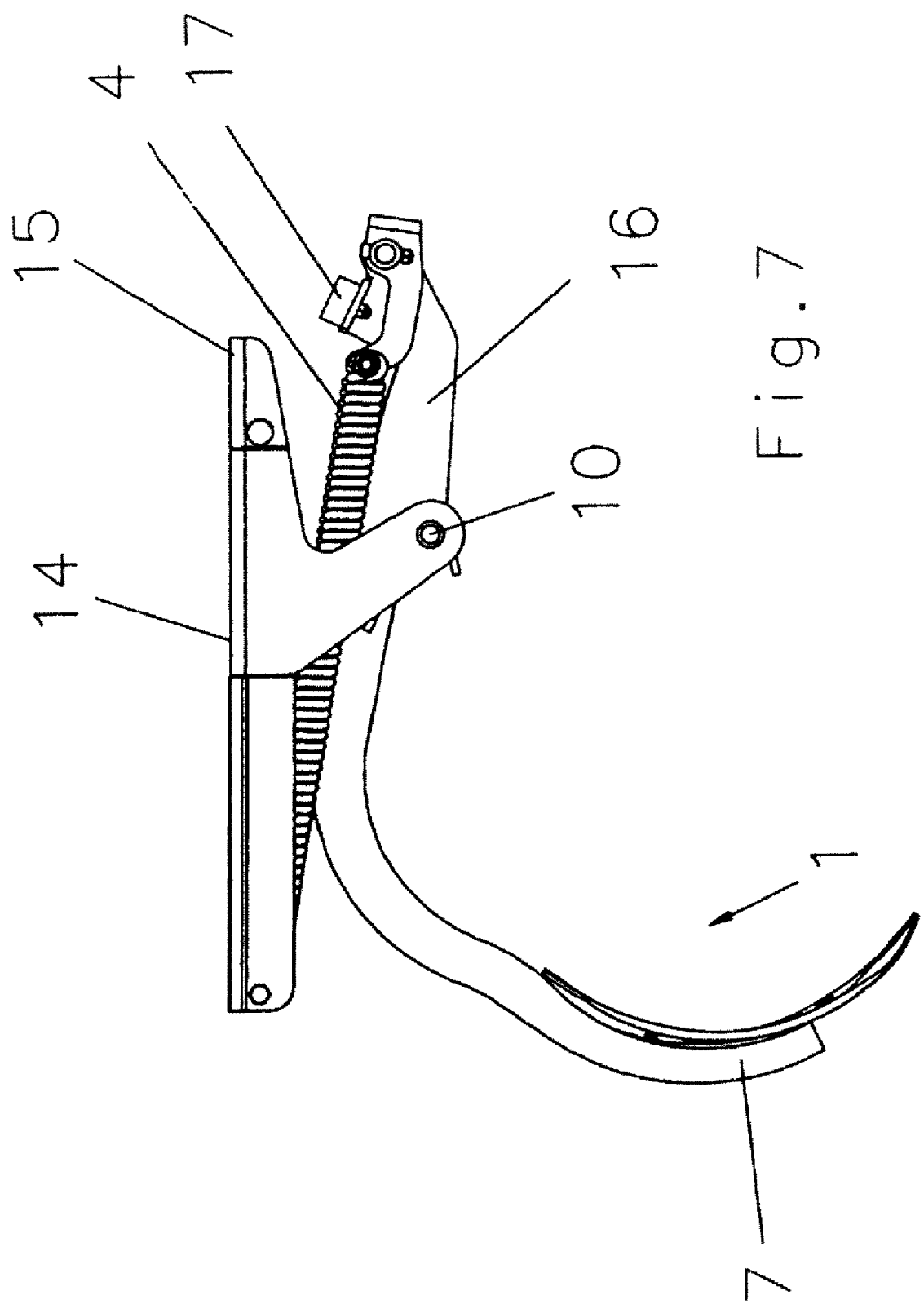
Figure 8:
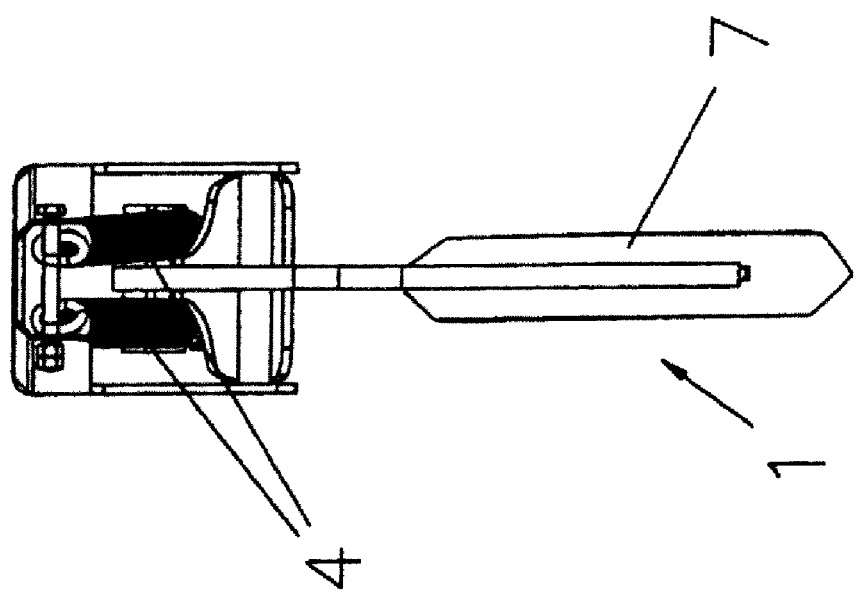
Figure 9:
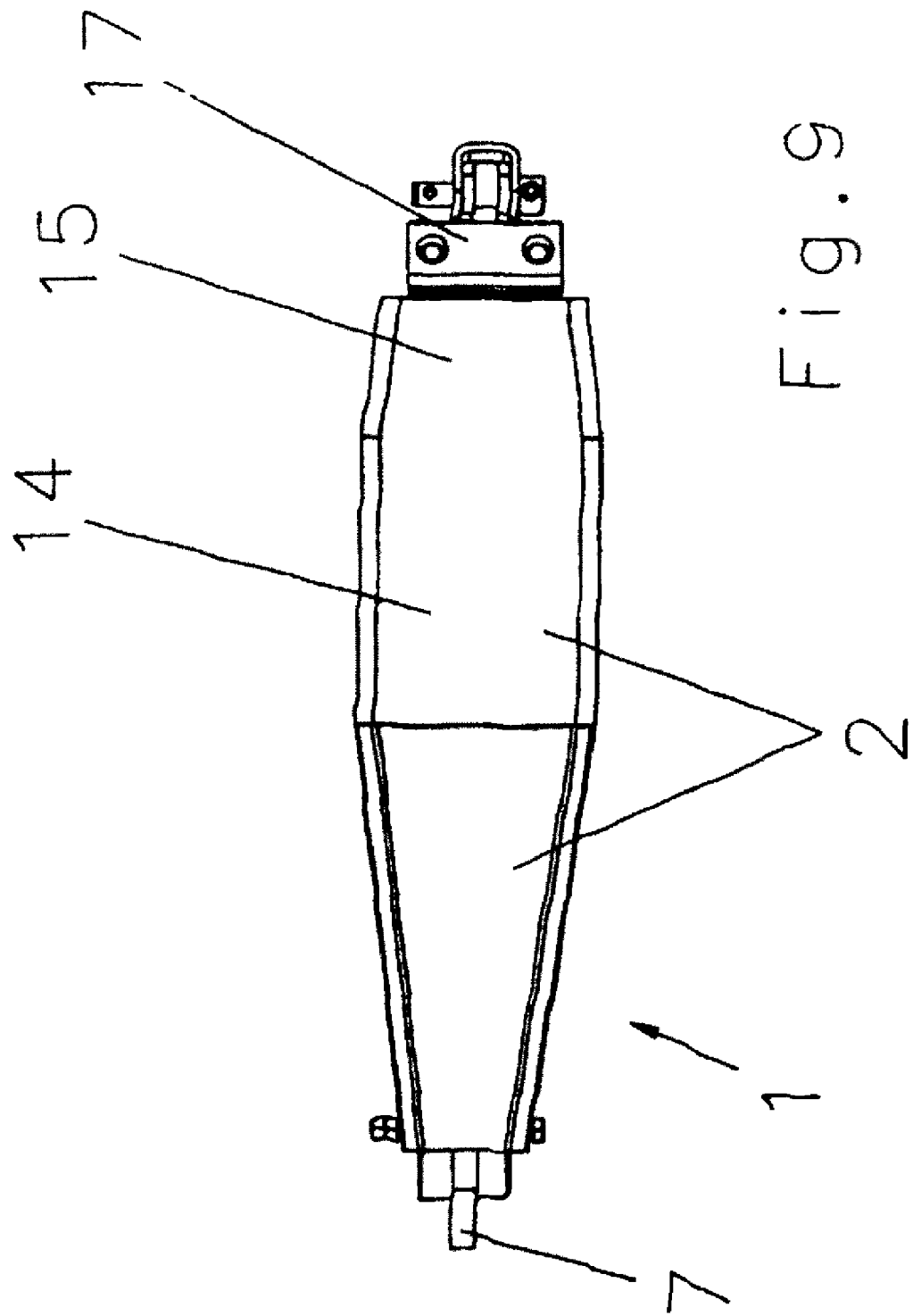

If the agricultural tool 1, 7 meets obstacles in the soil with its lower region, wherein the force comes exclusively from the front and no sideways forces act, then the agricultural tool 1, 7 swivels about the articulated axle of the pivot bolt 10 backwards and upwards, as shown in FIGS. 7-9. After overcoming the obstacle the prong tip of the agricultural tool 1, 7 moves rapidly forwards into the working position illustrated in FIGS. 2 to 6 due to the force exerted by the spring 4. Here, the damping element 17 dampens the agricultural tool 1, 7.

Figure 10:
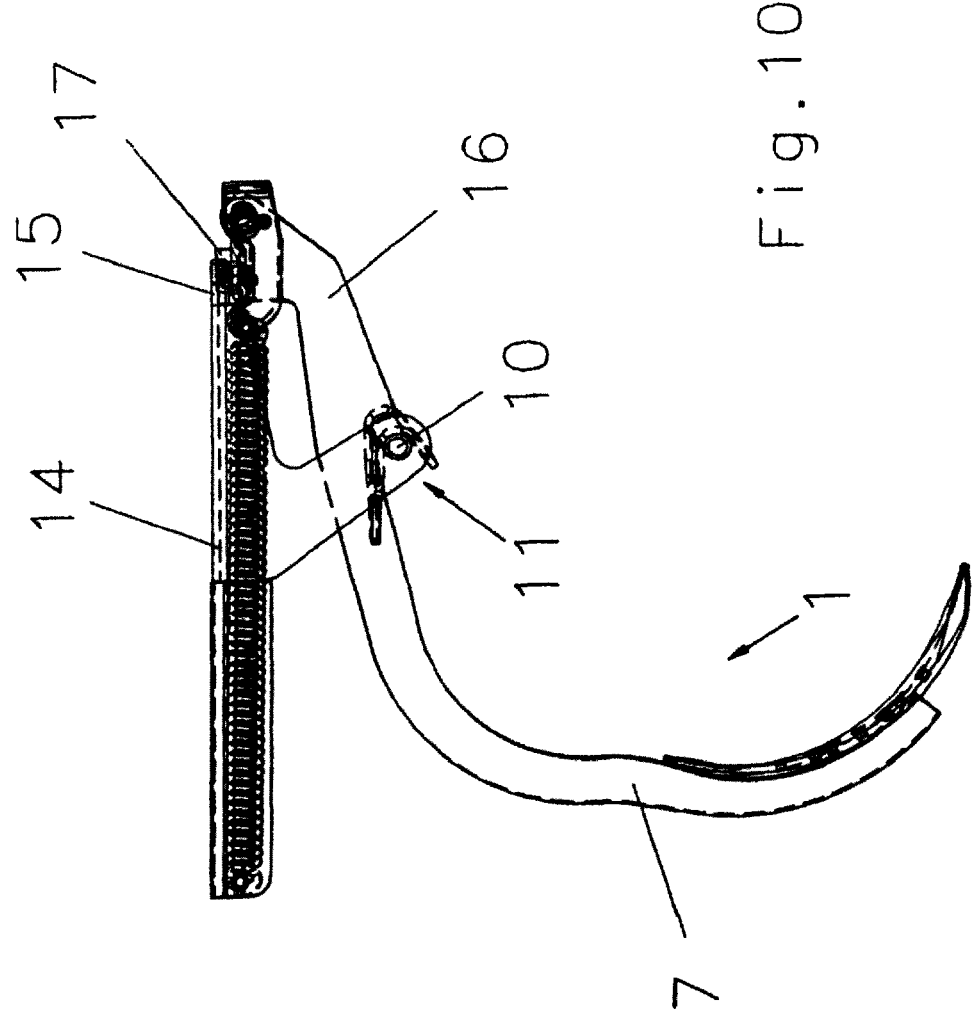
Figure 11:
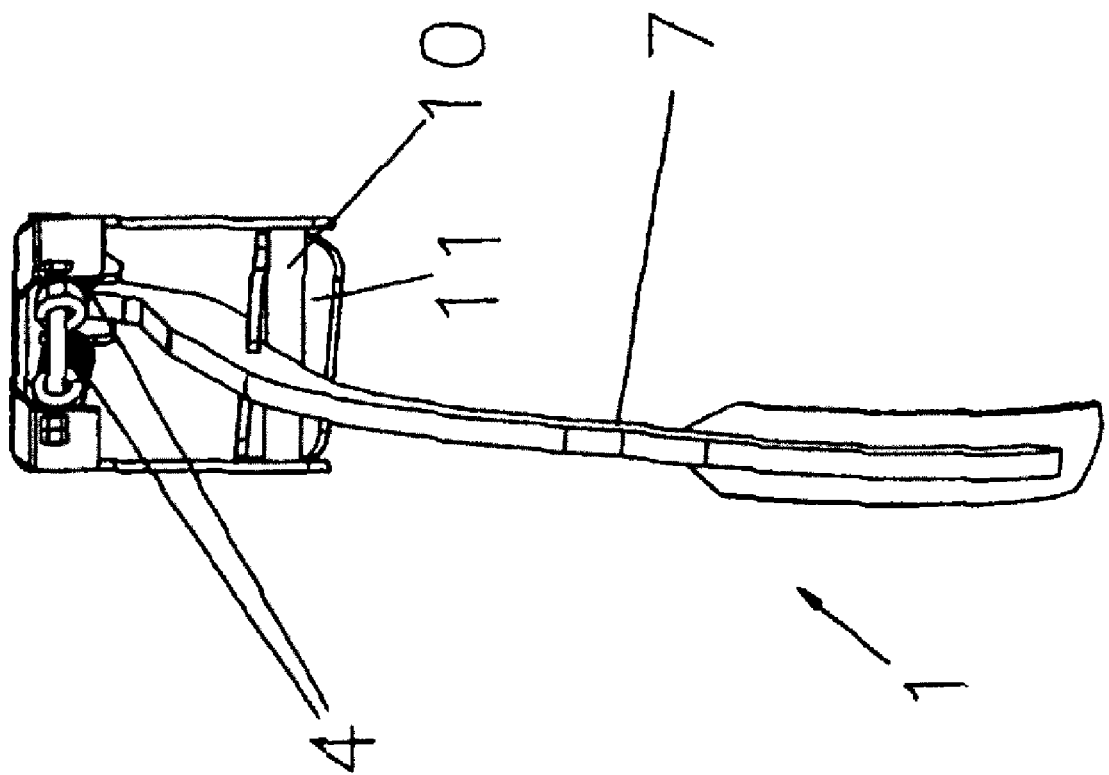
Figure 12:
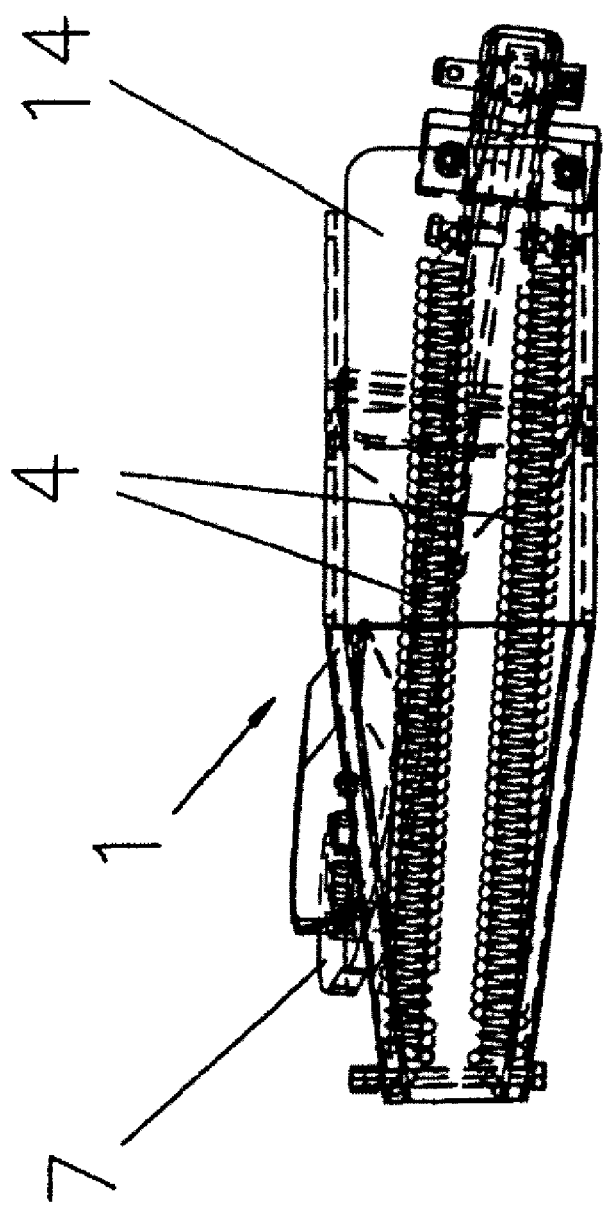

If the lower region of the agricultural tool 1, 7 meets an obstacle located in the soil at the side, where the force acts exclusively sideways, then the prong 1, 7 yields to the side, as illustrated in FIGS. 10-12. Here the V or U-shaped joint retainer 11 lifts up on one side from the pivot bolt 10 and the agricultural tool 1, 7 swivels to the side. After overcoming or passing the obstacle the agricultural tool 1, 7 swivels back into the working position illustrated in FIGS. 2-6.

Figure 13:
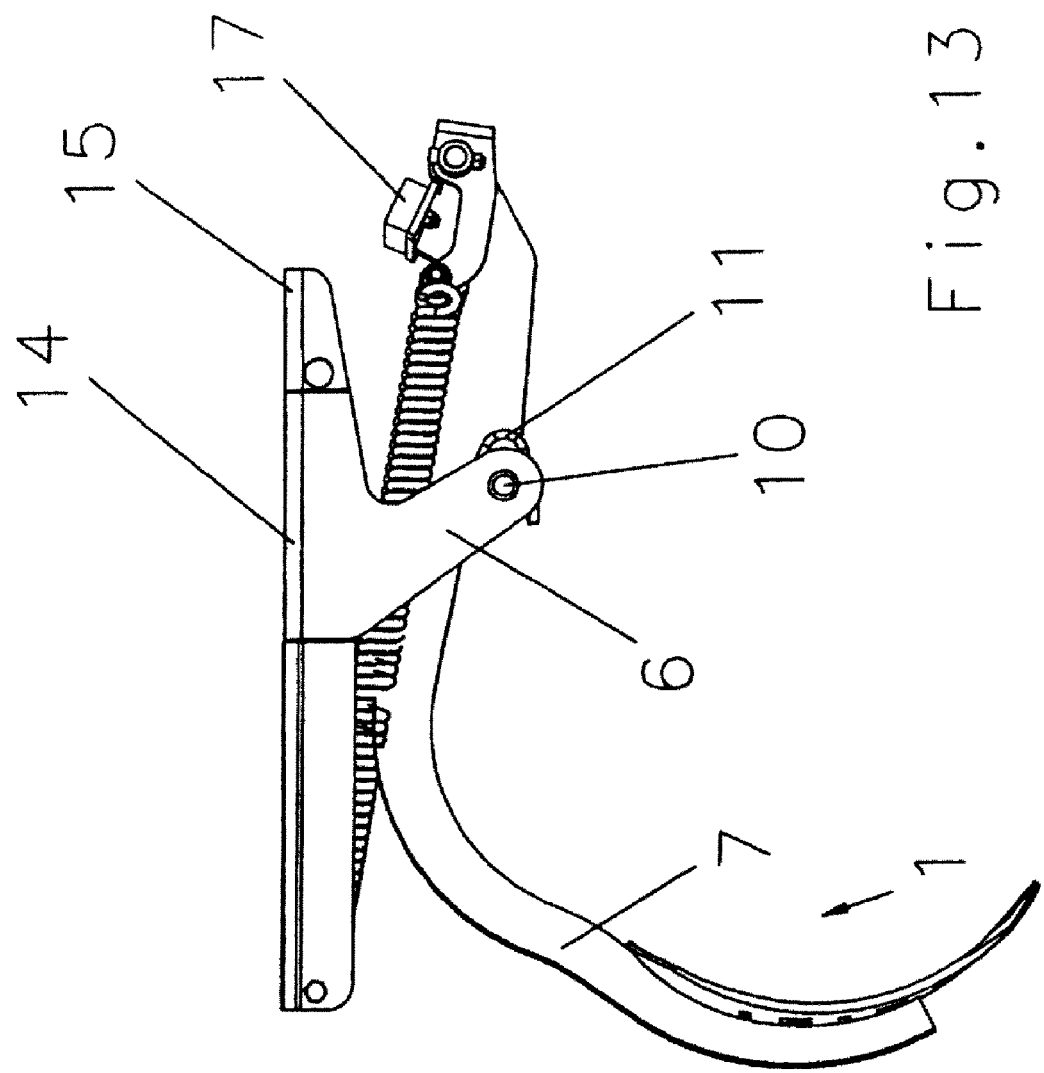
Figure 14:
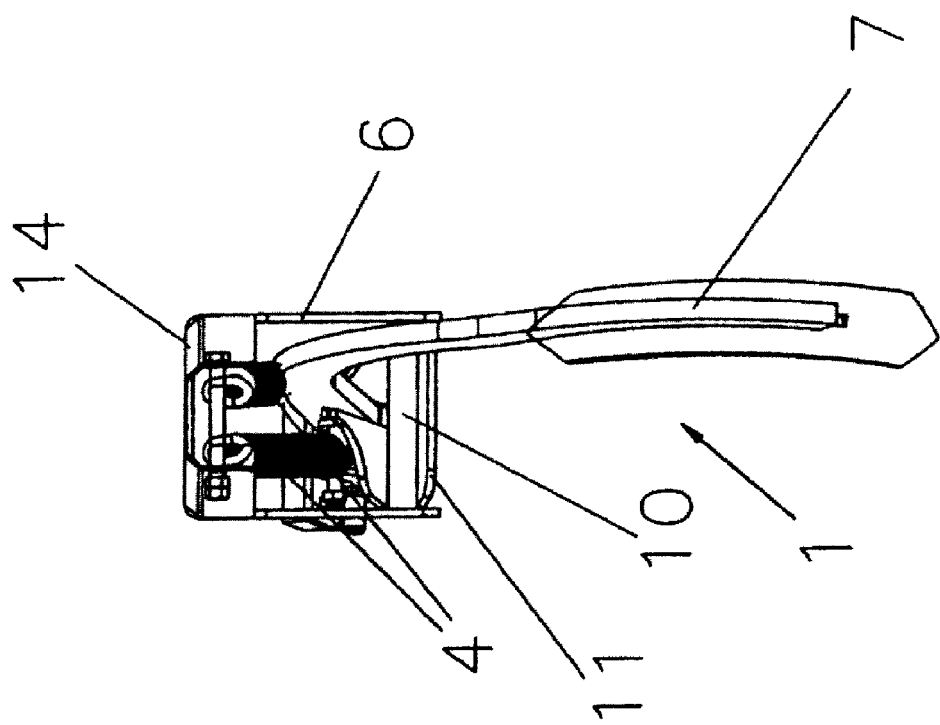
Figure 15:
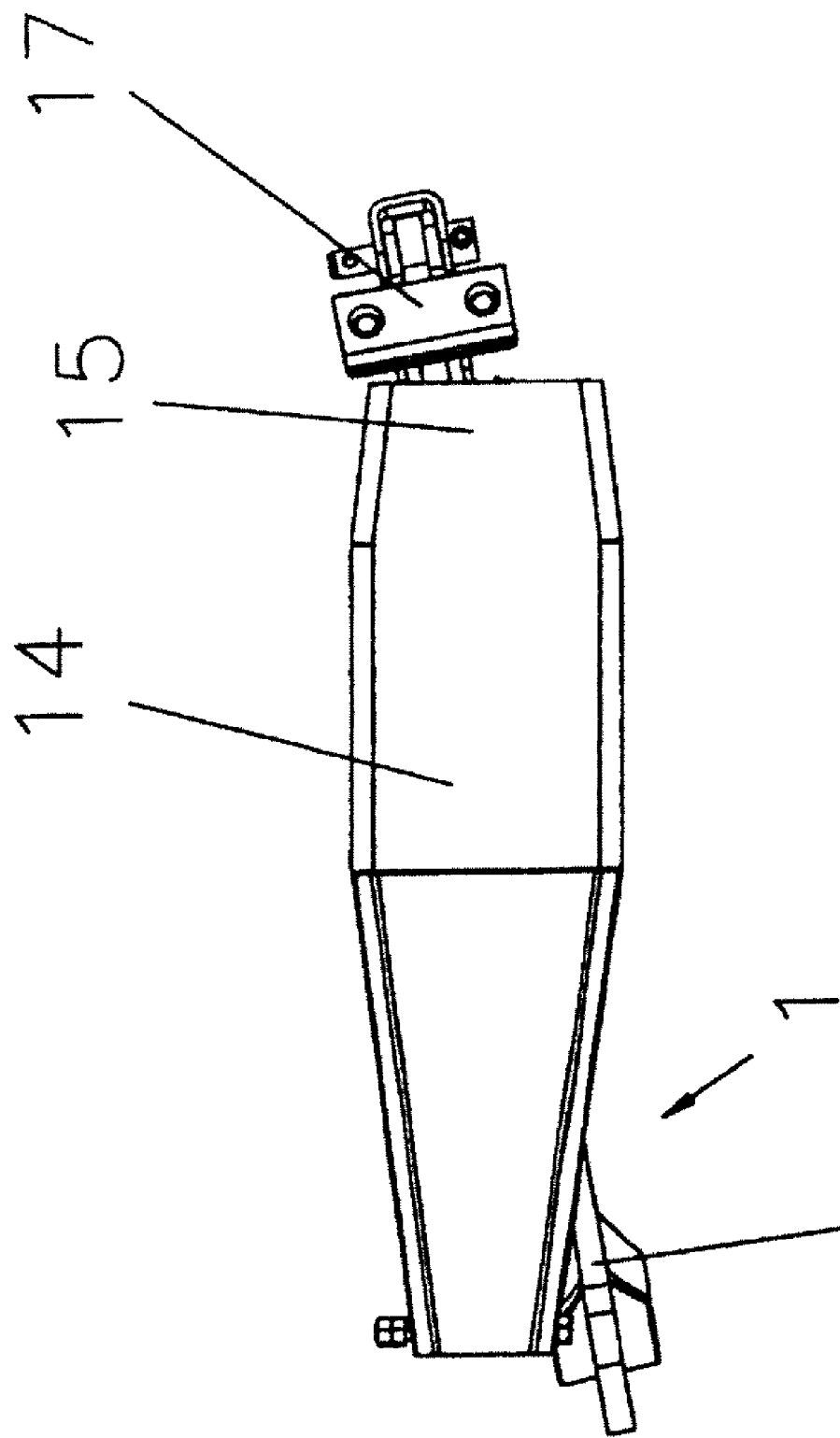

When the agricultural tool 1, 7 meets an obstacle located in the soil such that forces act both from the front and from the side, then the agricultural tool 1, 7 swivels simultaneously to the side and backwards and upwards, as illustrated in FIGS. 13-15. Here the V or U-shaped joint retainer 11 lifts up on one side from the pivot bolt 10 and simultaneously the agricultural tool 1, 7 swivels about the articulated axle passing through the pivot bolt 10 to the back so that a combined sidewards and backwards movement of the prong tip of the agricultural tool 1, 7 is produced. After overcoming and passing the obstacle, the agricultural tool 1, 7 swivels back under spring action into the position illustrated in FIGS. 2-6 due to the force exerted by the spring arrangement.

Figure 16:
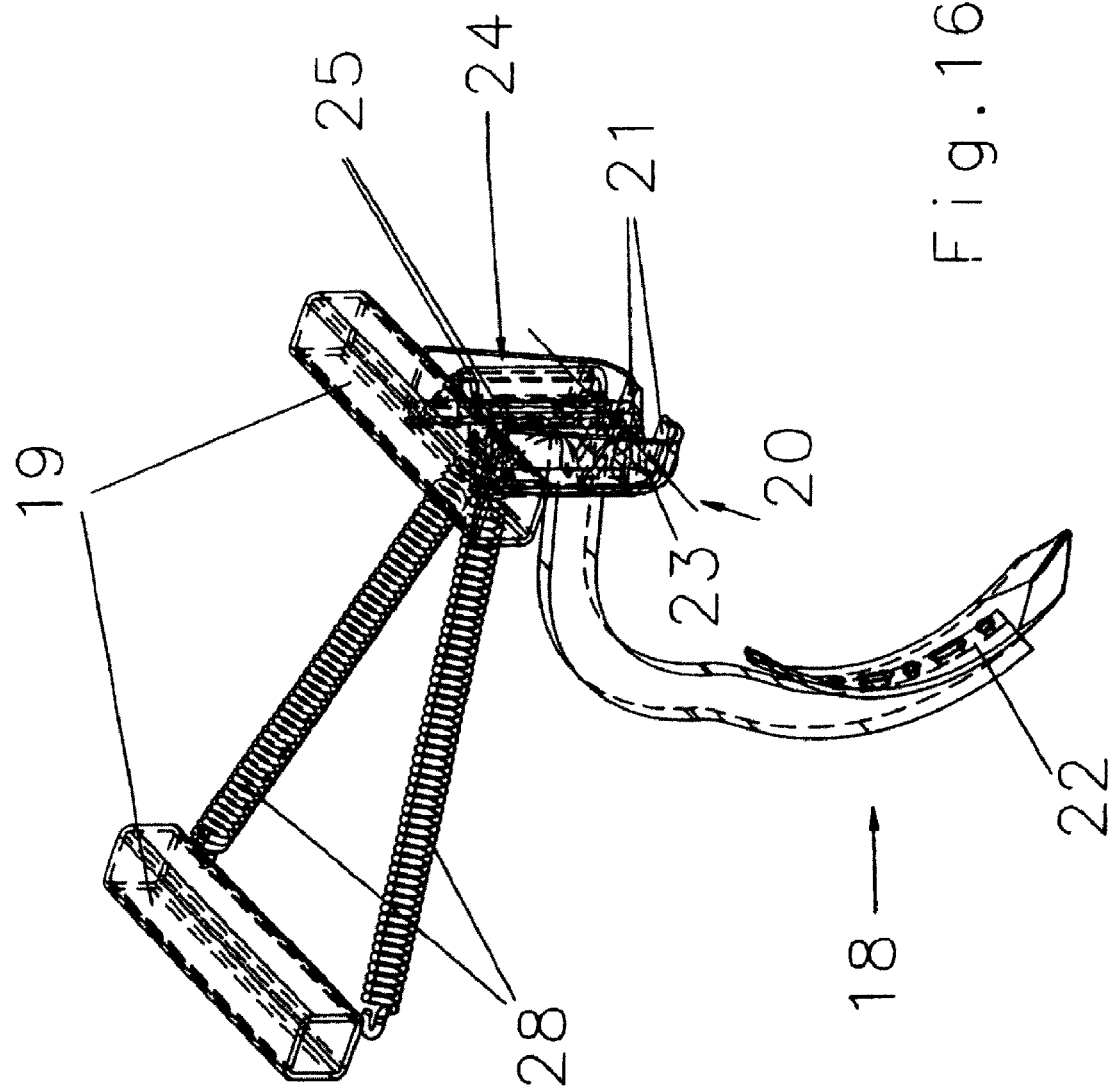
Figure 17:
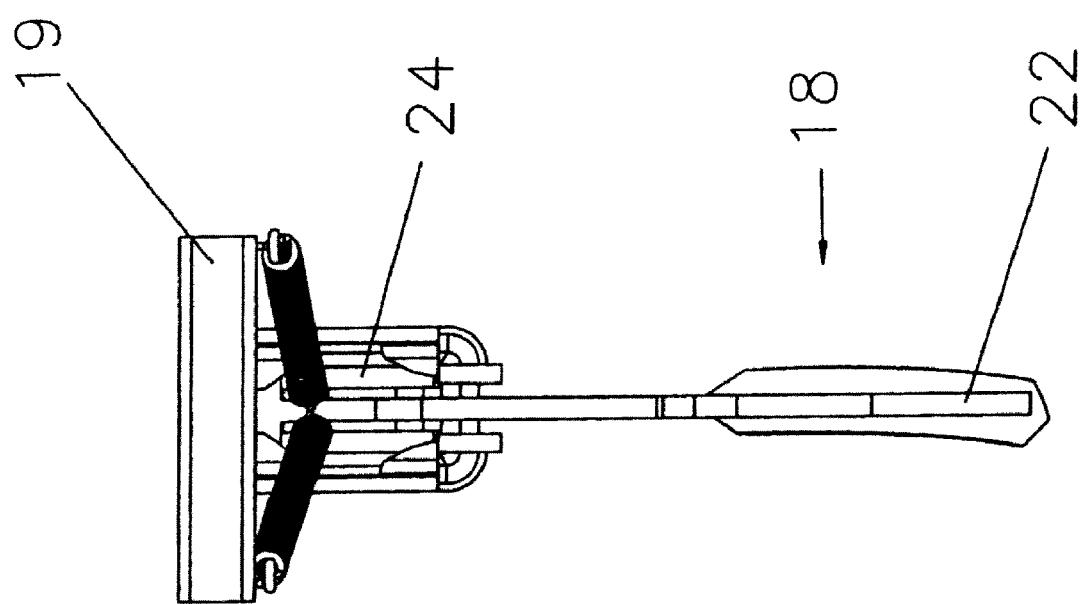
Figure 18:
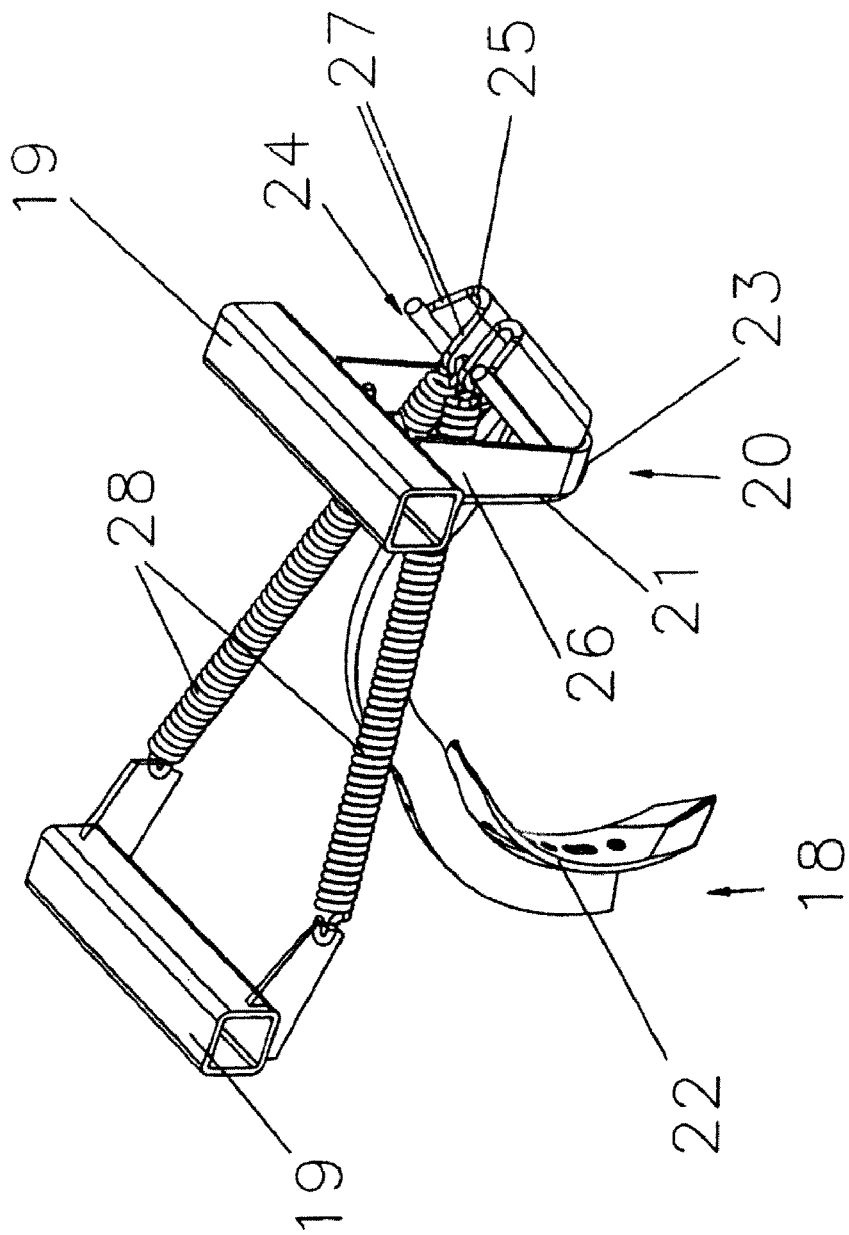

FIGS. 16-18 illustrate a further joint arrangement and overload protection device for an agricultural tool 18 which is also formed as a cultivator prong. On the carrier frame 19 the lower joint retainer 20 is arranged, which has two retainers 21 spaced from one another and fork-shaped which are open on the front. Both of these fork-shaped retainers 21 are arranged spaced from one another. On the prong 22 of the agricultural tool 18 a pivot bolt 23 is arranged which lies in these fork-shaped retainers 21. The joint retainer 20 with the fork-shaped retainers 21 is assigned to a carrier frame 19, whereas the pivot bolt 23 is arranged on the joint parts assigned to the agricultural tool 22. The upper support arrangement 24 of the overload protection device has the two V and U-shaped elevations 26 which extend in the perpendicular direction and interact with a correspondingly formed recess 25. The V or U-shaped elevations 26 are arranged on the joint part arranged on the carrier frame 19, whereas on the joint part, which is assigned to the agricultural tool 22, V and U-shaped joint retainers 25, which have funnel-shaped areas 27, arranged facing one another, are formed. The spring arrangement 28 is arranged on the upper ends of the V or U-shaped joint parts 25 assigned to the pivot bolt 23 and to the agricultural tool 22, which holds together the mutually supporting joint parts. Also this joint arrangement ensures that the agricultural tool 18, 22 can yield backwards as well as sideways or sideways and backwards and upwards, as indicated in FIG. 18.

The invention claimed is:

1. An overload protection device for agricultural equipment, comprising:
 a carrier frame and an agricultural tool for working the soil;
 a joint connecting the agricultural tool to the carrier frame, the joint having two mutually supporting joint parts including a first joint part and a second joint part,
  the first joint part comprising at least one pivot bolt extending in operative position of the agricultural equipment horizontally and transversely to a working direction of the agricultural tool of the agricultural equipment,
  the second joint part comprising at least one joint retainer supported on the pivot bolt of the first joint part,
  one of the first and second joint parts mounted on the agricultural tool and the other of the first and second joint parts mounted on the carrier frame; and
 a spring arrangement disposed between the carrier frame and the agricultural tool for producing a spring load yieldably positioning the agricultural tool into a working position relative to the carrier frame such that during operation of the agricultural equipment, when the agricultural tool meets an obstacle in the soil acting with force exclusively from the front on the agricultural tool backwards, the agricultural tool swivels backwards in the joint about an axis of the pivot bolt and relative to the carrier frame towards an upper yielded position,
 wherein the joint is situated between a soil contacting tip of the agricultural tool and an upper end of the agricultural tool, and distant from the upper end, the upper end being linked to the spring arrangement, and
 wherein the at least one joint retainer of the second part of the joint is supported on the pivot bolt by the spring load of the spring arrangement and has one of a V-shaped or U-shaped cross-section fitting on the pivot bolt, so that when a force from an obstacle in the soil acts on the agricultural tool from a side, the at least one joint retainer lifts up on one side from the pivot bolt or the pivot bolt lifts up from the at least one joint retainer and the agricultural tool yields in the joint to a side in relation to the carrier frame and the working direction.

2. The overload protection device according to claim 1, wherein the V-shaped or U-shaped joint retainer extends over the length of the pivot bolt and includes two funnel-shaped facing joint bearing surfaces with rounded swivel bearing surfaces matched to the pivot bolt.

3. The overload protection device according to claim 1, wherein the at least one joint retainer comprises two fork-shaped elements arranged spaced from one another for being supported on the pivot bolt.

4. The overload protection device according to claim 1, wherein the at least one joint retainer is open at the front or the back, seen in working direction of the agricultural equipment.

5. The overload protection device according to claim 1, wherein the at least one joint retainer is arranged on the carrier frame with the pivot bolt being arranged on the agricultural tool.

6. The overload protection device according to claim 1, wherein the at least one joint retainer is arranged on the agricultural tool with the pivot bolt being arranged on the carrier frame.

7. The overload protection device according to claim 1, wherein either at least one V or U-shaped elevation extends downwards substantially in a vertical direction from the carrier frame for interaction with a correspondingly V or U-shaped recess formed at the upper end of the agricultural tool, or at least one V or U-shaped recess extends from the carrier frame for interaction with at least one V or U-shaped elevation formed at the upper end of the agricultural tool.

8. The overload protection device according to claim 1, further comprising at least one elastic damping element provided between the upper end of the agricultural tool and the carrier frame.

9. The overload protection device according to claim 1, wherein the overload protection device including the agricultural tool is arranged at a mounting element, the mounting element having a mounting region formed by at least an approximately horizontal upper side thereof for mounting the mounting element to a lower side of the carrier frame.

10. The overload protection device according to claim 1, wherein the agricultural tool is located in the upper yield position below the level of the carrier frame.

11. The overload protection device according to claim 8, wherein the elastic damping element comprises a plate formed of one of a polyurethane and a rubber.

* * * * *